US008938478B2

(12) United States Patent
Couch et al.

(10) Patent No.: US 8,938,478 B2
(45) Date of Patent: Jan. 20, 2015

(54) DYNAMIC PRESENTATION OF WEB CONTENT

(75) Inventors: Dale Couch, Orlando, FL (US); Anibal Santiago, Orlando, FL (US); Timothy Tryzbiak, Orlando, FL (US)

(73) Assignee: Google Inc., Mountain View, CA (US)

( * ) Notice: Subject to any disclaimer, the term of this patent is extended or adjusted under 35 U.S.C. 154(b) by 814 days.

(21) Appl. No.: 11/115,664

(22) Filed: Apr. 27, 2005

(65) Prior Publication Data

US 2005/0187967 A1    Aug. 25, 2005

Related U.S. Application Data

(63) Continuation-in-part of application No. 11/068,424, filed on Feb. 28, 2005, now Pat. No. 7,584,210, which is a continuation of application No. 10/035,635, filed on Dec. 28, 2001, now Pat. No. 6,917,941.

(60) Provisional application No. 60/567,869, filed on May 5, 2004.

(51) Int. Cl.
*G06F 17/30* (2006.01)
*G06Q 30/02* (2012.01)

(52) U.S. Cl.
CPC ..................................... *G06Q 30/02* (2013.01)
USPC .......................................................... 707/805

(58) Field of Classification Search
CPC ... G06Q 30/02; G06Q 30/0601; G06Q 30/06; G06Q 10/02; G06Q 10/087; G06Q 30/04
USPC ........................ 707/10, 999.102, 805; 705/37
See application file for complete search history.

(56) References Cited

U.S. PATENT DOCUMENTS

| 4,992,940 | A | 2/1991 | Dworkin |
|---|---|---|---|
| 5,004,270 | A | 4/1991 | Broderick et al. |
| 5,047,614 | A | 9/1991 | Bianco |
| 5,361,871 | A | 11/1994 | Gupta et al. |
| 5,630,068 | A | 5/1997 | Vela et al. |
| 5,696,366 | A | 12/1997 | Ziarno |
| 5,754,981 | A | 5/1998 | Veeneman et al. |

(Continued)

FOREIGN PATENT DOCUMENTS

| WO | WO-2000039738 A1 | 7/2000 |
|---|---|---|
| WO | WO-2001027837 A2 | 4/2001 |

OTHER PUBLICATIONS http://web.archive.org/web/20010330223616/http://www.youknowbest.com/help.index/cfm.*

(Continued)

*Primary Examiner* — Sheree Brown
(74) *Attorney, Agent, or Firm* — Johnson, Marcou & Isaacs, LLC

(57) ABSTRACT

Dynamic presentation of web content is provided. One embodiment comprises a computer system for dynamically presenting market channel information associated with items on a web site to a customer. One such computer system comprises: a data service containing information for a plurality of products and a plurality of market participants; and a product web page for displaying information related to a product, the product web page comprising program code that instructs a client browser to query the data service to determine whether the product has available market channel information.

22 Claims, 8 Drawing Sheets

(56) References Cited

U.S. PATENT DOCUMENTS

| | | | |
|---|---|---|---|
| 5,774,874 A | 6/1998 | Veeneman et al. | |
| 5,870,716 A | 2/1999 | Sugiyama et al. | |
| 5,898,594 A | 4/1999 | Leason et al. | |
| 5,909,023 A | 6/1999 | Ono et al. | |
| 5,970,474 A | 10/1999 | LeRoy et al. | |
| 5,999,914 A | 12/1999 | Blinn et al. | |
| 6,026,376 A | 2/2000 | Kenney | |
| 6,076,091 A | 6/2000 | Fohn et al. | |
| 6,272,472 B1 | 8/2001 | Danneels et al. | |
| 6,535,880 B1 | 3/2003 | Musgrove et al. | |
| 6,609,106 B1 | 8/2003 | Robertson | |
| 6,643,624 B2 | 11/2003 | Philippe et al. | |
| 6,654,726 B1 * | 11/2003 | Hanzek | 705/26.5 |
| 6,691,112 B1 | 2/2004 | Siegel et al. | |
| 6,693,236 B1 | 2/2004 | Gould et al. | |
| 6,725,222 B1 | 4/2004 | Musgrove et al. | |
| 6,745,229 B1 * | 6/2004 | Gobin et al. | 709/206 |
| 6,917,941 B2 * | 7/2005 | Wight et al. | 1/1 |
| 7,065,940 B2 | 6/2006 | Dudek et al. | |
| 7,072,859 B1 | 7/2006 | Huber | |
| 7,136,829 B2 | 11/2006 | Hellal et al. | |
| 7,496,525 B1 | 2/2009 | Mitchell | |
| 7,584,210 B2 * | 9/2009 | Wight et al. | 705/26.1 |
| 2001/0037259 A1 | 11/2001 | Sharma et al. | |
| 2002/0062275 A1 | 5/2002 | Dyke | |
| 2002/0069153 A1 | 6/2002 | Lin | |
| 2002/0128851 A1 | 9/2002 | Chefalas et al. | |
| 2002/0152131 A1 | 10/2002 | Lee | |
| 2002/0184102 A1 | 12/2002 | Markopoulos et al. | |
| 2002/0184208 A1 * | 12/2002 | Kato | 707/4 |
| 2003/0018540 A1 | 1/2003 | Volpi et al. | |
| 2003/0050848 A1 | 3/2003 | Defayette et al. | |
| 2003/0080999 A1 | 5/2003 | Stone et al. | |
| 2003/0115107 A1 | 6/2003 | Amensen et al. | |
| 2003/0120550 A1 | 6/2003 | Peyrelevade et al. | |
| 2003/0131021 A1 | 7/2003 | Wight et al. | |
| 2003/0139969 A1 | 7/2003 | Scroggie et al. | |
| 2003/0167209 A1 | 9/2003 | Hsieh | |
| 2003/0167222 A1 * | 9/2003 | Mehrotra et al. | 705/37 |
| 2003/0172005 A1 | 9/2003 | Hellal et al. | |
| 2003/0225632 A1 | 12/2003 | Tong et al. | |
| 2004/0107145 A1 | 6/2004 | Skurdal et al. | |
| 2004/0249643 A1 | 12/2004 | Ouyang et al. | |
| 2004/0249723 A1 | 12/2004 | Mayer | |
| 2005/0004880 A1 | 1/2005 | Musgrove et al. | |
| 2007/0150370 A1 * | 6/2007 | Staib et al. | 705/26 |

OTHER PUBLICATIONS http://articles.orlandosentinel.com/2000-08-28/business/0008280049 1 tracking-software-internet-central-florida.*

U.S. Appl. No. 12/133,184, Non-Final Office Action dated Mar. 31, 2010, 9 pages; and corresponding response dated Jun. 30, 2010, 7 pages.

* cited by examiner

DYNAMIC PRESENTATION OF WEB CONTENT

CROSS-REFERENCE TO RELATED APPLICATIONS

This application is a continuation-in-part application of U.S. application Ser. No. 11/068,424, entitled "Method and Apparatus for Creation and Maintenance of Database Structure" and filed Feb. 28, 2005 now U.S. Pat. No. 7,584,210, which is a continuation application of U.S. application Ser. No. 10/035,635, entitled "Method and Apparatus for Creation and Maintenance of Database Structure" and filed Dec. 28, 2001 now U.S. Pat. No. 6,917,941, both of which are hereby incorporated by reference in their entirety. This application also claims the benefit of U.S. application Ser. No. 60/567,869, entitled "Method, Apparatus and Computer Software System for Dynamic Presentation of Market Channel Information" and filed May 5, 2004, which is also hereby incorporated by reference in its entirety.

BACKGROUND

Currently, there are various systems and methods for controlling the content to be displayed on web sites. The underlying code for generating the content or functionality on a web page may specify the object (e.g., text, images, multimedia, etc.) to be displayed on the web page. The code, such as HTML or the like, may also specify the location for obtaining the particular object to be displayed by, for example, a uniform resource locator (URL). In this instance, the code is interpreted by the browser (or other client program) in such a way that the browser obtains the object to be displayed from another computer system on the web. It is also common for web pages to invoke client-side code that generates the object(s) to be displayed. A client-side script is a program that may accompany, for example, an HTML document or be embedded directly in it. The program executes on the client's machine when the document loads, or at some other time, such as when a link is activated.

Typically, the content on a web site is distributed across numerous linked web pages because of the inherent visual limitations of the presentation medium, and other design/content considerations. Information on one web page may include links to additional web pages, content, functionality, etc. For example, there are a number of situations in which it is desirable to provide information regarding an item (or multiple items) on one web page, and more detailed information regarding the item(s) on subsequent web pages. The more detailed information on the subsequent page(s) may be accessed by engaging a link on the first web page. In some situations, the more detailed information on subsequent web page(s) is time-variant. For example, when the link on the current page is engaged, the time-variant data may be displayed in the linked page(s). However, additional information may or may not be included in the linked page(s). Thus, at certain times the link on the first web page may direct the user to more detailed information on the linked page, while at other times the link is "dead"—i.e., the subsequent page does not include any useful information.

By way of further illustration of this problem, many electronic commerce web sites (e.g., manufacturer web sites, shopping comparison sites, on-line retailers, value-add resellers, etc.) provide a series of web pages for searching for information regarding various products or services. The products or services may be searched and viewed based on hierarchical categories of goods/services. Such web sites often provide a product web page which displays product information for various products. If a user is interested in purchasing the particular product (or viewing market channel information associated with the product), the product web page enables the user to select a particular link to another web page which displays product availability, price, available retailers, and channel partners. It is often the case, however, that the market channel information changes over time depending on inventory, supply/demand, market considerations, channel partnering, business concerns, and the like. Thus, when the user selects the link on the product web page for a particular product, the linked web page does not provide market channel information. These dead links are a meaningful annoyance to would-be shoppers and, therefore, represent a substantial problem in the electronic commerce environment.

SUMMARY

Various embodiments of computer systems, methods, computer software, web sites, web pages, and related computer equipment are provided. One embodiment is a web page embodied on a web site. One such web page comprises: first presentation information to be rendered via a client program; and dynamic presentation code to be identified by the client program for querying a data service to determine whether second presentation information is to be rendered via the client program.

Another embodiment is a method for dynamically displaying content on a web page. One such method comprises: requesting a web page from a web site; rendering first information in the web page; and querying a data service to determine if there is second presentation information to be rendered in the web page. Another such method comprises: requesting a first web page from a web site; rendering first information in the first web page; querying a data service to determine if there is second presentation information to be rendered in a second web page linked to the first web page; and if there is second presentation information, indicating, on the first web page, that the second presentation information is available via the second web site.

Yet another embodiment is a product web page embodied on an electronic commerce web site. One such product web page comprises: first presentation information associated with a product to be rendered via a client program; and dynamic presentation code to be identified by the client program for querying a data service to determine whether there is market channel information available for the product to be displayed on a market channel information web page associated with the product.

A further embodiment comprises a method for dynamically presenting market channel information associated with items on a web site to a customer. One such method comprises: providing a product web page that displays information regarding a product, and availability information for the product; rendering the information regarding the product via a client program; and querying a data service for the availability information for the product.

Another embodiment comprises a computer system for dynamically presenting market channel information associated with items on a web site to a customer. One such computer system comprises: a data service containing information for a plurality of products and a plurality of market participants; and a product web page for displaying information related to a product, the product web page comprising program code that instructs a client browser to query the data service to determine whether the product has available market channel information.

BRIEF DESCRIPTION OF THE DRAWINGS

Many aspects of the invention can be better understood with reference to the following drawings. The components in the drawings are not necessarily to scale, emphasis instead being placed upon clearly illustrating various principles of embodiments of the present invention.

FIG. 7 is a screen shot illustrating an embodiment of a product web page for implementing dynamic presentation code to display market channel information for a product.

FIG. 8 is a screen shot illustrating a market channel information web page linked to the product web page of FIG. 7 via the product availability button.

DETAILED DESCRIPTION

Figure 1:
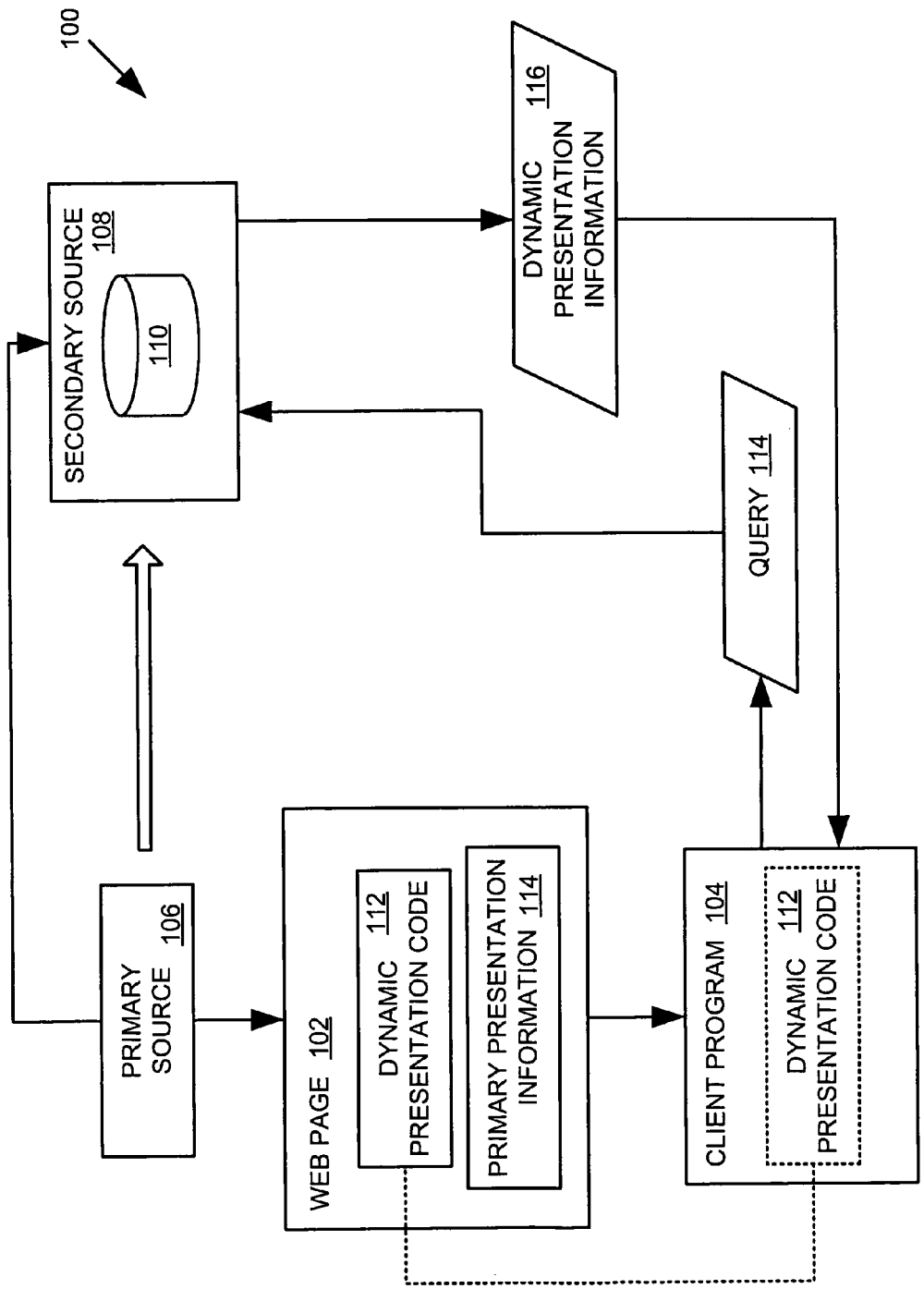
FIG. 1 is a block diagram illustrating one embodiment of a system for dynamically presenting web content.

Various embodiments of computer systems, methods, computer software, web sites, web pages, and related computer equipment, are provided. Various embodiments are described below with respect to FIGS. 1-9. An exemplary embodiment of a computer system for dynamically presenting web content is briefly described to illustrate certain aspects.

In general, the exemplary computer system comprises a web page embodied on a web server and a client program (e.g., a web browser) for executing code associated with the web page and, thereby, displaying the web page. The web page may include typical web content that is displayed via the client program. This content displays information regarding a particular item. The web page also comprises dynamic presentation code for determining whether additional information related to the particular item is available for presentation. The dynamic presentation code comprises a software mechanism—executed or otherwise interpreted by the client program—for querying a data service to determine whether additional information associated with the item is available for presentation on a linked web page. If the response to the database query indicates that additional information is available for the item, the client program displays—on the current web page—appropriate information to indicate that additional information is available for the item on the linked page. The current web page may not display the additional information. Rather, the current web page may indicate that additional information is available on a subsequent web page via a link on the current page. If the response to the database query indicates that additional information regarding the particular item is not available, the client program may display nothing (or display alternative content). In this manner, the dynamic presentation code provides a dynamic link between two web pages by "looking ahead" via the data service to determine whether additional information is available before an associated link is actually engaged by a user.

To further illustrate the principles and commercial relevance of the dynamic "look ahead" feature, one implementation of the dynamic presentation code in an electronic commerce web site will be described. Dynamic presentation code may be integrated with a product web page, which displays product-related information for a number of products on a single web page. The purveyor of the electronic commerce web site may leverage separate instances of the above-described dynamic presentation code for each product displayed on the product web page. When the product web page is downloaded by a client browser or other client program, each instance of the dynamic presentation code initiates a query to a data service to determine whether market channel information is available for each of the products.

As briefly described above and in the above-identified parent of this application, the electronic commerce web site (and associated channel partners or market participant) may provide various forms of market channel information to the data service for various supported products or services. As an example, the market channel information may specify information about products or service on the web site, as well as channel partners and market participants that are authorized to provide the corresponding products or services. In response to the query from the client program, the data service determines whether each product has any available market channel information, and passes this information to the client program. In one embodiment, rather than displaying the market channel information (or lack thereof) within the product web page, the product web page identifies whether market channel information is available for each product (e.g., via a product availability, or other, button, link, text, graphics, etc.). In certain embodiments, if market channel information is not available, nothing is displayed. Thus, the user may easily discern within the product web page, and without engaging multiple links for each product, which products have available market channel information and which do not.

It should be appreciated that the data service may be implemented in a variety of ways. In one of a number of possible embodiments, the data service may be supported by a central data repository, database, etc. that provides response to the queries initiated by the dynamic presentation code. In alternative embodiments, however, the data service may be implemented as an aggregated, unified data service. The aggregated, unified data service may employ a system that uses one or more processes to acquire, aggregate, and organize information that will be returned to the client program requesting the data service. In some embodiments, the data service may comprise a system that acquires data from different sources, aggregates the data to generate a collective knowledge, and stores the collective knowledge in, for example, a schema-less metabase—as described in the parent application identified above. The collective knowledge may be leveraged by the data service to evaluate queries from the client program requesting the data service. The collective knowledge may also be leveraged in such a way to generate individualized responses to queries from the client program.

In certain embodiments, the data service may be supplemented with additional data service layers between the client program and the collective knowledge embodied in the schema-less metabase. In other words, the data service is distributed across multiple service layers, and the dynamic presentation code functions as a portable and flexible pipeline to the collective knowledge.

FIG. 1 illustrates another embodiment of a computer system 100 for dynamically presenting web content. As illustrated in FIG. 1, computer system 100 comprises a web page 102 which is displayed via a client program 104, such as a browser or other computer program or application. The content associated with web page 102 is provided to client program 104 from two sources: a primary source 106 and a secondary source 108. Primary source 106 provides primary presentation information 114 to client program 104, and secondary source 108 (e.g., a data service provider, data service) provides dynamic presentation information 116 (if any) to client program 104 based on a query to database 110.

As illustrated in FIG. 1, primary source 106 provides web page 102 to client program 104. Web page 102 may include primary presentation information 114 and dynamic presentation code 112. Primary source 106 may comprise any suitable web site. In response to receiving dynamic presentation code 112, client program 104 initiates a database query 114 to secondary source 110 to determine whether any dynamic presentation information 116 is to be displayed for web page 102. Secondary source 108 queries database 110 to determine if (based on query criteria provided by client program 104 or primary source 106) dynamic presentation information 116 is to be displayed. The query criteria may be automatically passed to secondary source 108 via client program 104, or may be provided by primary source 106 as a separate communication or manual transaction. If the database query results in a match of the query criteria, dynamic presentation information 116 is provided to client program 104 for display in web page 102. If there is not a match, client program 104 does not display any dynamic presentation information in web page 102 (or may display alternative content). In this manner, primary source 106 may dynamically present information in web page 102 based on information in database 110. It should be appreciated that this dynamic presentation scheme may be particularly advantageous in situations in which primary source 106 has outsourced at least a portion of the web content to second source 108. As described below in more detail, primary source 106 may associate with second source 108 to provide a data service by which portions of the data associated with the web content are provided.

Figure 2:
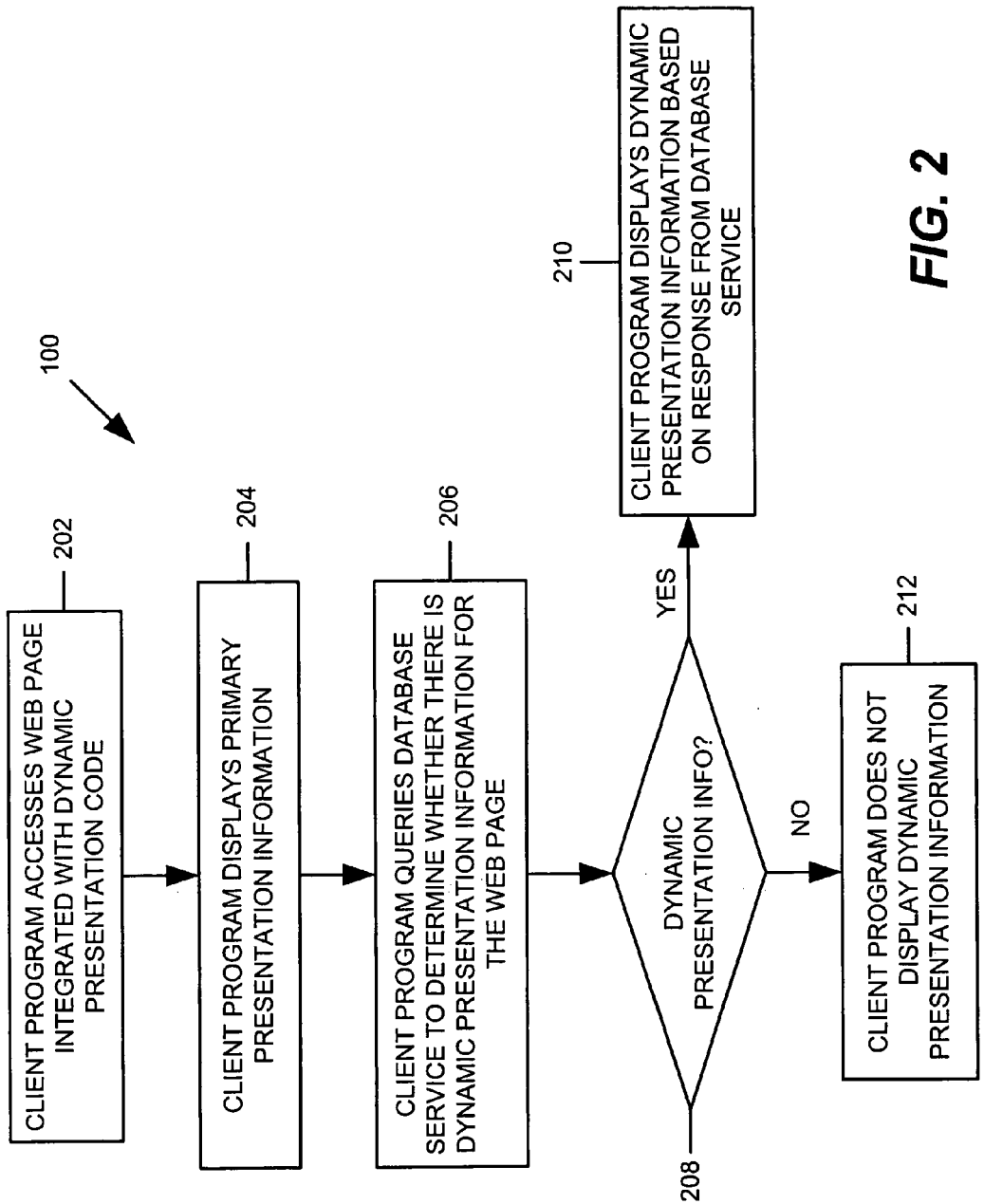
FIG. 2 is a flow chart illustrating the general operation, functionality, and/or architecture of the system of FIG. 1.

FIG. 2 illustrates the architecture, operation, and/or functionality of computer system 100 from the perspective of client program 104. At block 202, client program 104 accesses web page 102 (which includes dynamic presentation code 112 and primary presentation information 114). At block 204, client program 104 displays primary presentation information 114 and, at block 206, client program 104 queries a data service provided by secondary source 108 to determine whether there is dynamic presentation information 116 for web page 102 (decision block 208). It should be appreciated that the data service supported by dynamic presentation code 112 may be leveraged in various business models with various technologies. Client program 104 displays dynamic presentation information 116 if the results of the database query indicate as such (block 210). Client program 104 may also take no further action if the database query does not result in the identification of dynamic presentation information 116 (block 212). In this manner, dynamic presentation code 112 provides a convenient mechanism which enables primary source 106 and secondary source 108 to combine resources to dynamically provide web content in real-time or near real-time.

As mentioned above, dynamic presentation code 112 may be configured to provide a dynamic database look-ahead feature which provides a dynamic link between two web pages. In certain embodiments, dynamic presentation code 112 enables a current web page to "look ahead" to determine database value(s) associated with a to-be-linked-to web page (i.e., one that may be accessed via a hyperlink on the current web page) to determine whether the linked web page will contain information. If the "look ahead" identifies relevant database values for the linked web page, the current web page will indicate the availability of this information. If the "look ahead" does not identify relevant database values for the linked web page, the current web page may not provide a link to the otherwise linked page.

One of ordinary skill in the art will appreciate that the look-ahead and other features supported by embodiments of dynamic presentation code 112 may be advantageously leveraged in an electronic commerce web environment. Various implementations of dynamic presentation code 112 in an electronic commerce web environment 300 will be described with reference to FIGS. 3-9.

Figure 3:
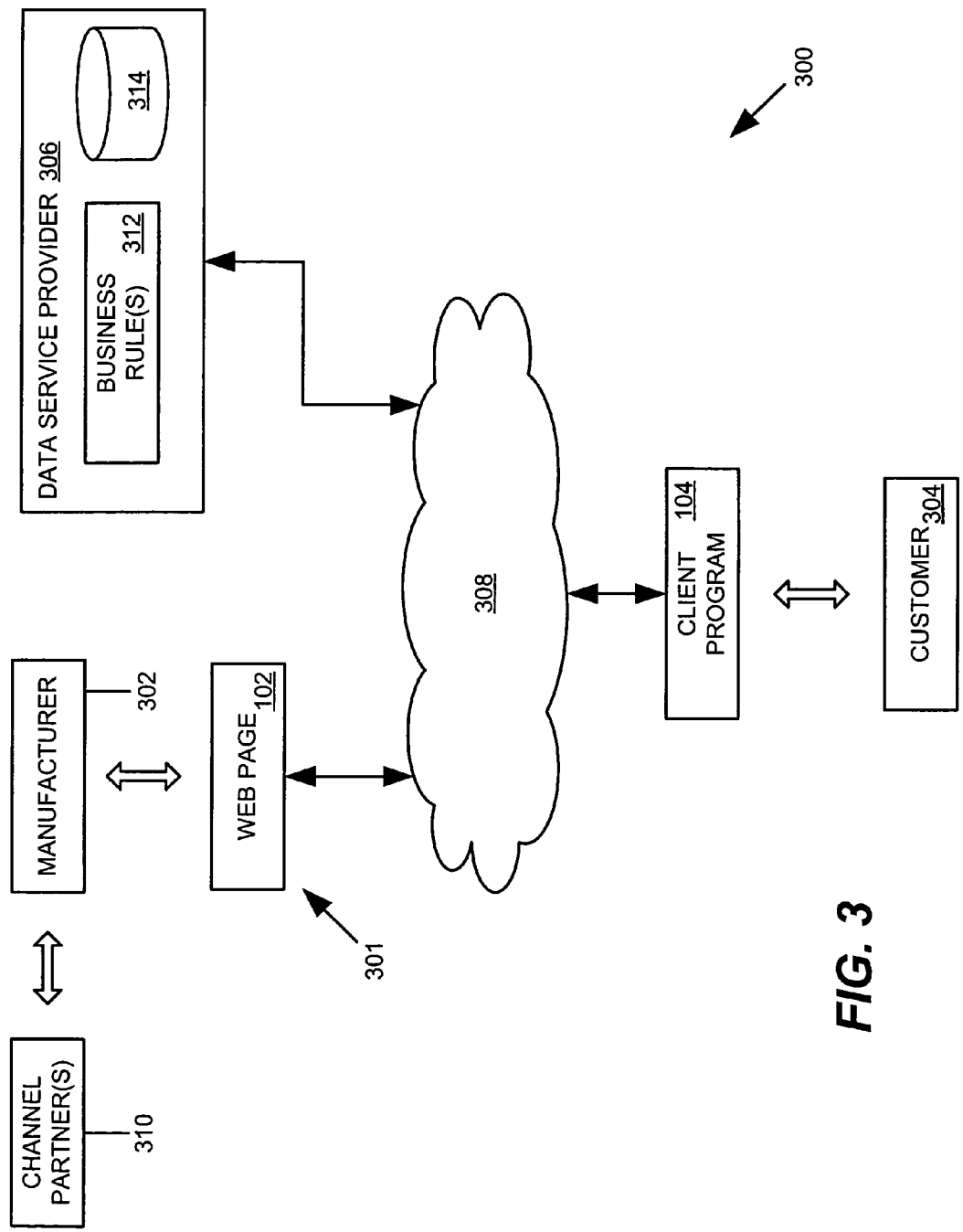
FIG. 3 is a block diagram illustrating another embodiment of a system for dynamically presenting web content.

Referring to FIG. 3, a manufacturer 302 may maintain a web site 301 on which the manufacturer displays information regarding its products or services. Web site 301 may display, on web page(s) 102, information related to the products or services offered by manufacturer 302, as well as information related to channel partner(s) 310 with which manufacturer 302 has a business relationship. In this regard, channel partner(s) 310 represent the vendors authorized to distribute the manufacturer's products or services. Channel partner(s) 310 may include on-line retailers, shopping comparison web sites, brick-and-mortar retailers, value-added resellers, or any other business entity (on-line or otherwise) authorized to offer the products or services of manufacturer 302.

As best illustrated in FIG. 3, electronic commerce web environment 300 comprises a data service provider 306, which includes a database 314 that stores information related to the manufacturer's products or services, and channel partner(s) 310 that are authorized to offer the products or services. In one embodiment, database 314 may be configured as a schema-less metabase in the manner described in the above-identified parent application. In this embodiment, information related to the manufacturer's products or services may be stored in a product database, and information related to the channel partners 310 may be stored in a vendor database. In alternative embodiments, however, database 314 may be configured as a conventional database. Regardless of the particular configuration of database 314, data service provider 306 provides a data service to manufacturer 302 in accordance with the functionality of dynamic presentation code 112. As described in more detail below, dynamic presentation code 112 leverages the resources of the data service to dynamically present market channel information to customers 304 who access web page(s) 102 via client program 104 and a communication network 308.

Manufacturer 302 may also provide various types of business rule(s) 312 to data service provider 306, which may function as an additional input to the data service. Business rule(s) 312 define logic to be applied by data service provider 306 when determining the market channel information associated with a particular product on a web page 102. Business rule(s) 312 may be provided in any matter, but, in one embodiment, they are provided via a user interface (not shown) supported by data service provider 306. The user interface, such as a web-based interface, may enable personnel of manufacturer 302 to create and/or edit business rule(s) 312.

Figure 4:
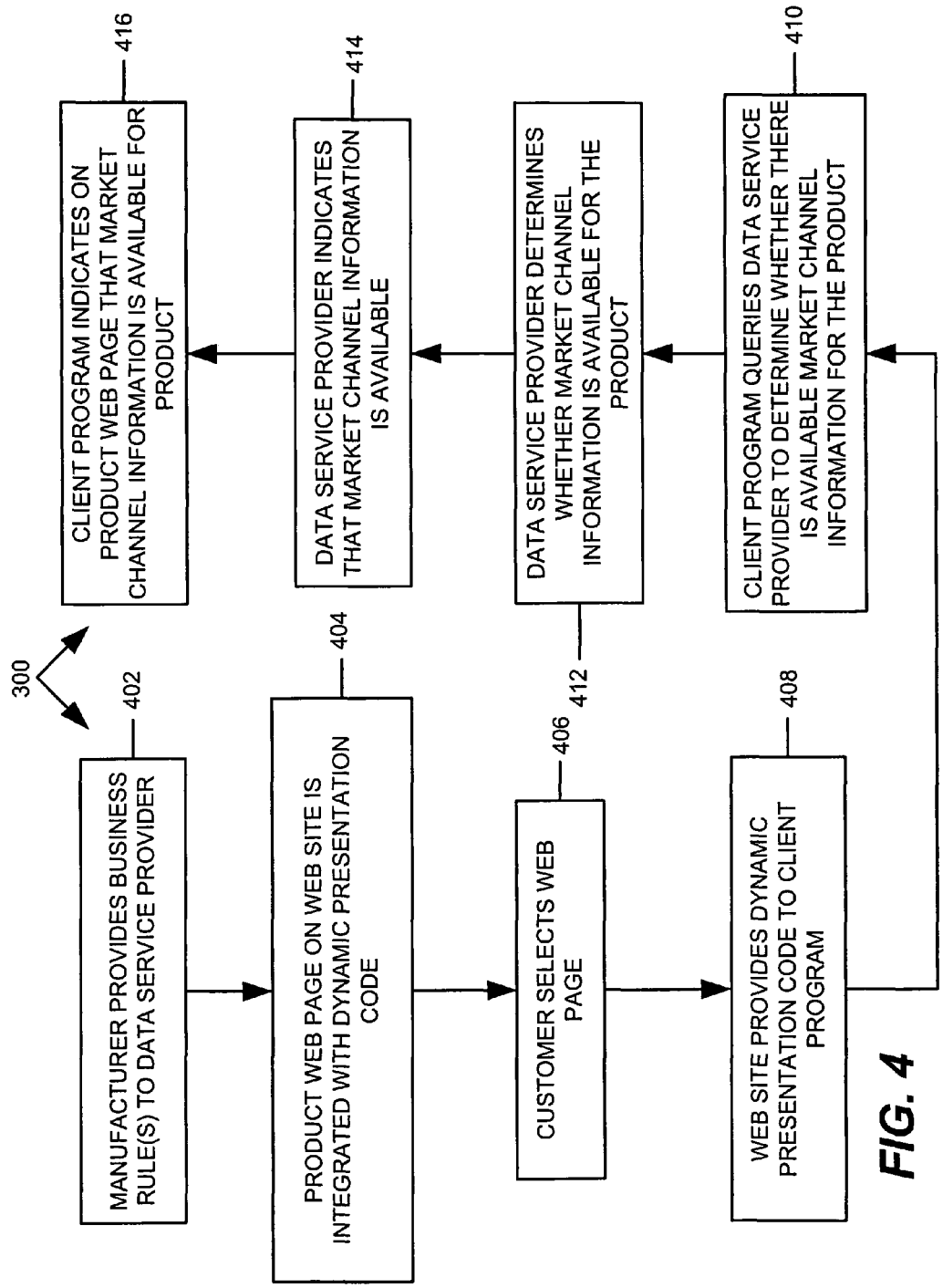
FIG. 4 is a flow chart illustrating the architecture, operation, and/or functionality of the system of FIG. 3.
Figure 5:
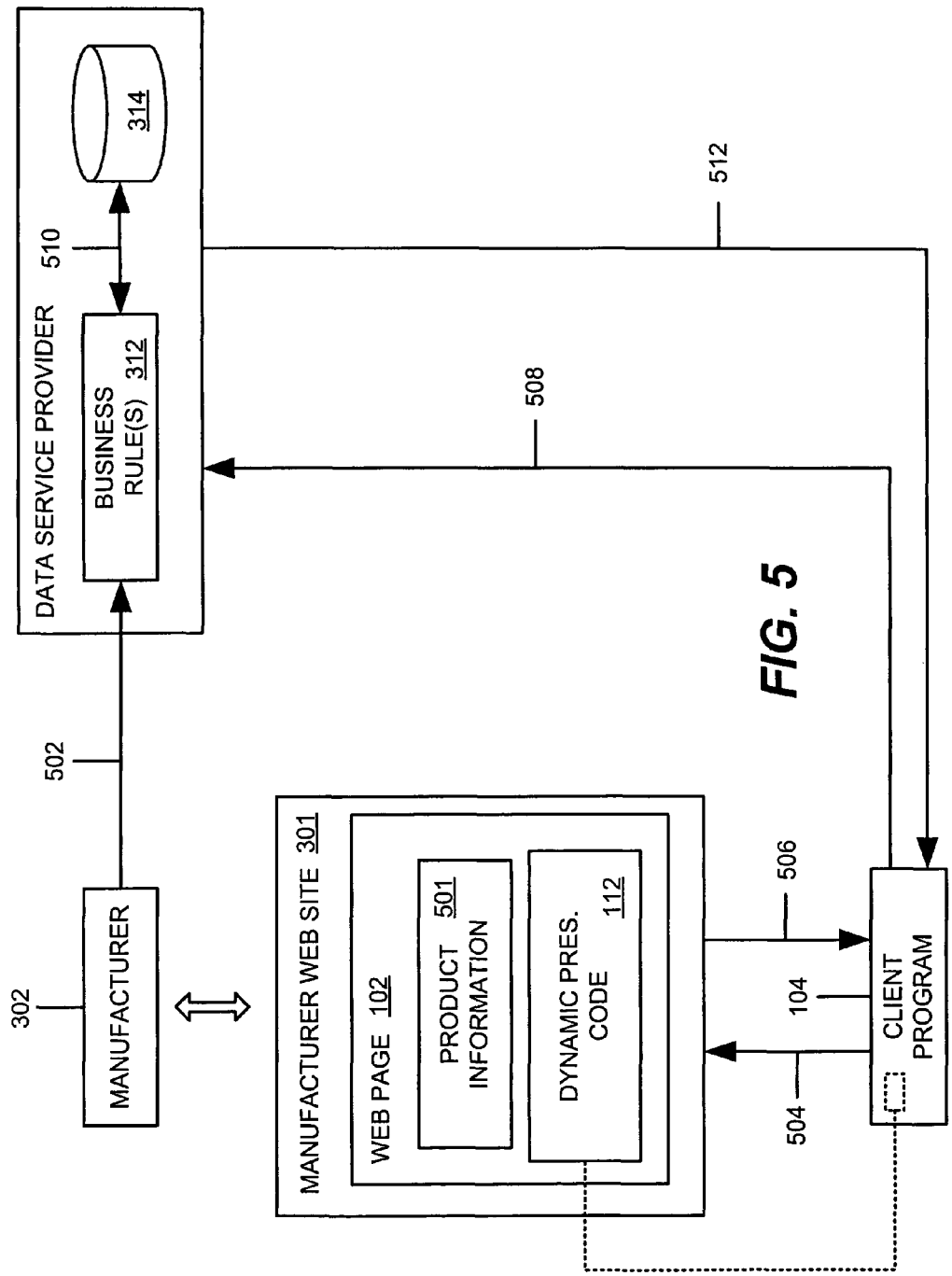
FIG. 5 is a combined block diagram and flow diagram illustrating another embodiment of a system for dynamically presenting market channel information in an electronic commerce web environment.

FIGS. 4 and 5 illustrate one implementation of dynamic presentation code 112 in electronic commerce web environment 300. Referring to the flow chart illustrated in FIG. 4, at block 402, manufacturer 302 provides business rule(s) 312 to data service provider 306. One or more web pages 102 on manufacturer web site 301 are integrated with dynamic presentation code 112. In one embodiment, a product web page (e.g., product page 700—FIG. 7) is integrated with dynamic presentation code 112. At block 406, customer 304 accesses the product web page (line 504—FIG. 5). At block 408 (line 506—FIG. 5), dynamic presentation code 112 associated with the web page is provided to client program 104, along with any additional web content (e.g., product information 501). At block 410 (line 508—FIG. 5), client program 104 queries data service provider 306 to determine whether there is available market channel information for at least one of the products associated with the product web page. The query for market channel information may be implemented via any suitable program interface. In one embodiment, dynamic presentation code 112 identifies the location of data service provider 306 (e.g., via a URL, network address). Client program 104 initiates a query that terminates at data service provider 306. The query may pass a product identifier, or other information suitable for identifying the product, to data service provider 306. The query may also pass information identifying manufacturer 302 (e.g., a vendor identifier).

Data service provider 306 processes the query by, for example, determining whether database 314 includes market channel information for the product identifier and/or the vendor identifier to be displayed on the product web page. Data service provider 306 may also apply various business rule(s) 312 to determine what information is to be provided to client program 104 (line 510—FIG. 5). At blocks 414 and 416, the results of the query are provided to client program 104 (line 512—FIG. 5).

Figure 6:
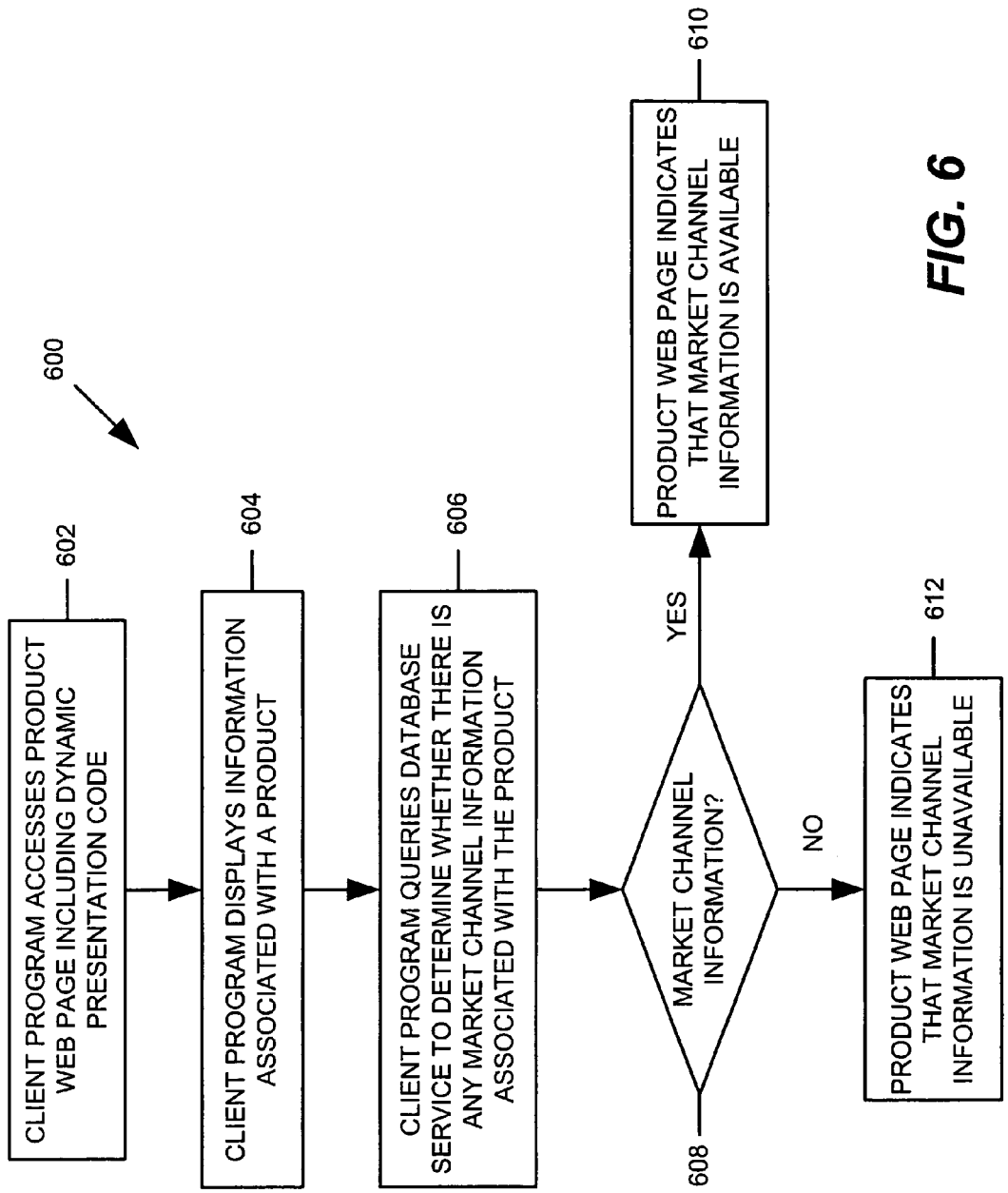
FIG. 6 is a flow chart illustrating the general operation, functionality, and/or architecture of the system of FIG. 5.
Figures 7, 8:
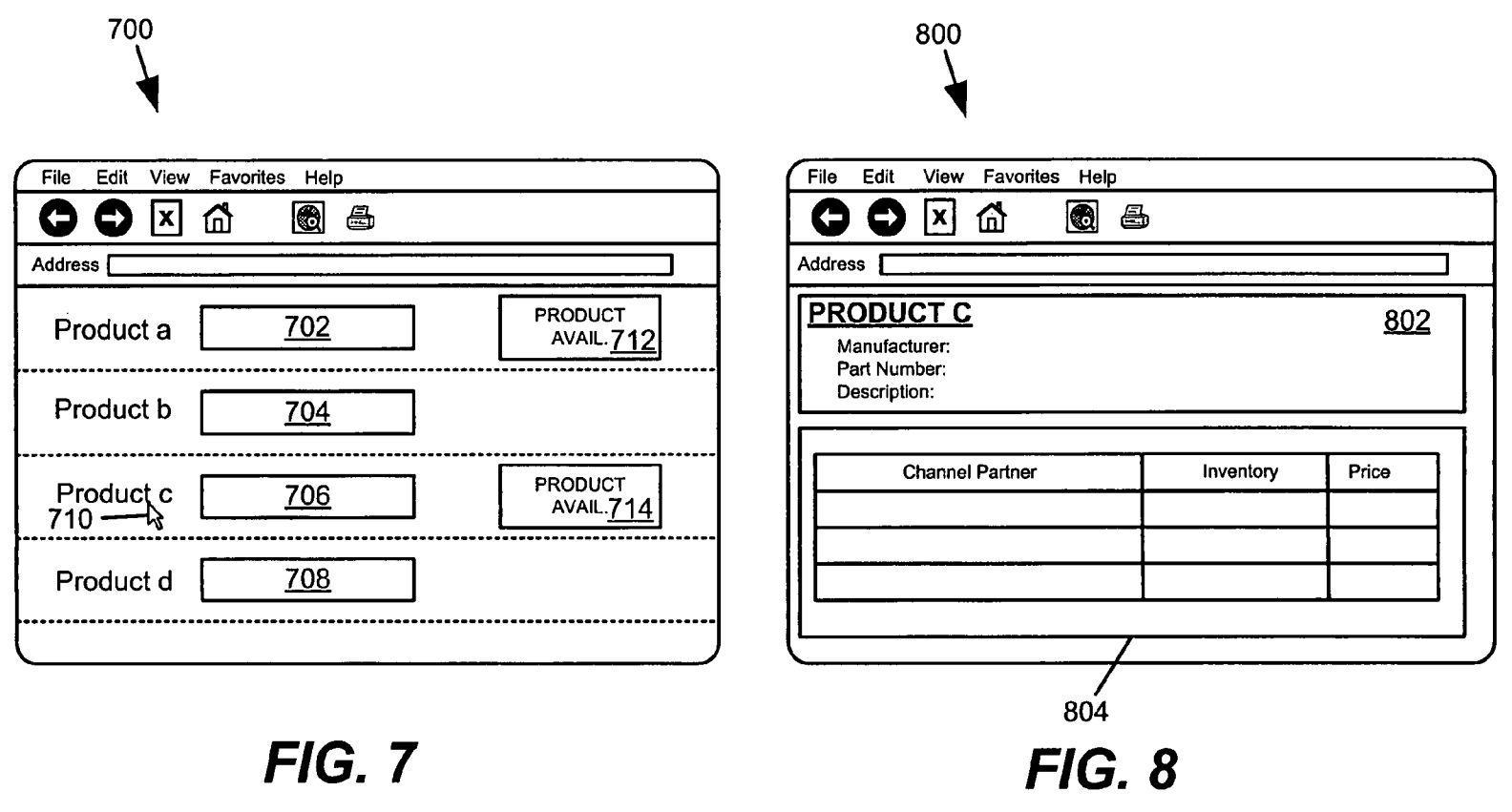

FIGS. 6-8 illustrate various implementations of dynamic presentation code 112 in electronic commerce web environment 300, from the perspective of client program 104. At block 602, client program 104 accesses a web page 102, such as product web page 700 (FIG. 7). The product web page may display information regarding various products or services offered via web site 301. In the embodiment illustrated in FIG. 7, product web page 700 displays information regarding Product A (object 702), Product B (object 704), Product C (object 706), and Product D (object 708). At block 604, client program 104 downloads dynamic presentation code 112, as well as the web content associated with the products to be displayed (product information 501). At block 606, client program 104 queries the data service associated with data service provider 306 to determine whether there is any available market channel information for the products displayed on product web page 700. It should be appreciated that multiple instances of dynamic presentation code 112 may be implemented for each product (or a single functionality may be implemented for all products). In one embodiment, dynamic presentation code 112 queries the data service for available market channel information for each product. Nonetheless, it should be further appreciated that the query may be performed for one or more of the products displayed on product web page 700.

The results of the query (or queries) are provided to client program 104. As illustrated at decision block 608 and block 610, if market channel information is available for a particular product, product web page 700 may display information indicating that market channel information is available for that product. Referring to the exemplary screen shot illustrated in FIG. 7, product web page 700 may display an appropriate object (e.g., a button, text, graphics, link, etc.) to indicate that the product(s) have available market channel information. Client program 104 may display any suitable information to indicate the availability of the market channel information. In the embodiment illustrated in FIG. 7, the response to the query from data service provider 306 indicates that Products A and C have available market channel information. To indicate the availability of market channel information for these products, client program 104 displays product availability buttons 712 and 714 relative to the product information corresponding to the products for which market channel information is available (i.e., Product A and Product C, respectively). It should be appreciated that any content, functionality, etc. may be used to indicate the availability of the market channel information.

In one embodiment, product availability buttons 712 and 714 are configured as links to subsequent web pages that display additional information about the products. FIG. 8 illustrates a screen shot of a market channel information web page 800 associated with Product C. Market channel information web page 800 may be provided by manufacturer web site 301, and configured to display additional information related to Product C (object(s) 802). Market channel information web page 800 may also display a list 804 of channel partner(s) 310 where Product C may be purchased. List 804 may include inventory information, price information, and any other market-related information associated with the product. In this regard, it should be appreciated that data service provider 306 may provide real-time access to market information for channel partner(s) 310, including real-time inventory information based on queries to channel partner(s) 310. In alternative embodiments, database 312 may be periodically updated against data from channel partner(s) 310, and the data cached to provide near real-time access to the channel partner data.

As illustrated at decision block 608 and block 612 (FIG. 6), if market channel information is not available for a particular product, product web page 700 may display nothing. In the embodiment illustrated in FIG. 7, client program 104 does not display any information next to the products for which market channel information was not available (i.e., Product B and Product D). It should be appreciated, however, that client program 104 may display appropriate information to indicate that market channel information is not available for the particular products. The program interface between client program 104 and data service provider 306 may support any number of response states depending on the results of the database query and/or the application of business rules 312. In one implementation, the query response indicates whether market channel information is available or not, and client program 104 determines what information to display depending on the particular state. In another implementation, the query response may also instruct client program 104 what to display or how to display it.

Figure 9:
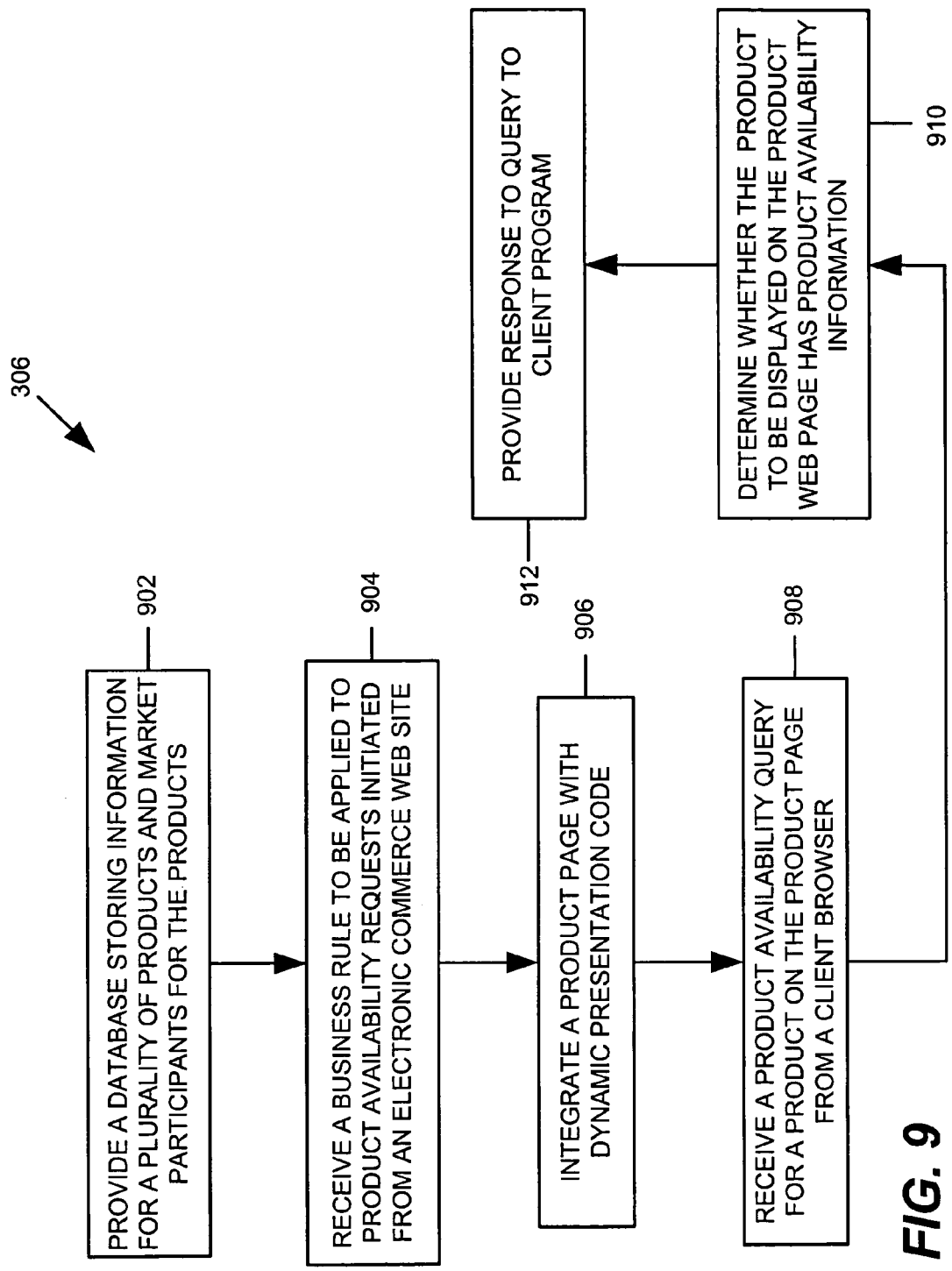
FIG. 9 is a flow chart illustrating, from the perspective of a data service provider, another embodiment of a method for dynamically presenting web content.

FIG. 9 illustrates an implementation of dynamic presentation code 112 in electronic commerce web environment 300, from the perspective of data service provider 306 and the associated data service. At block 902, data service provider 306 provides a database 314 for storing information related to the products or services of manufacturer 302, and channel partner(s) 310 authorized to offer them. At block 904, data service provider 306 receives business rule(s) 312 from manufacturer 302. At block 906, dynamic presentation code 112 is integrated with one or more web pages 102 on the manufacturer's web site 301. Data service provider 306 may publish or otherwise specify the functionality or suitable program interface for dynamic presentation code 112 (and associated software). In this manner, manufacturer 302 may configure web page(s) 102 with the appropriate code to implement dynamic presentation code 112. At block 908, data service provider 306 receives a product availability query (or other query for market channel information) for a particular product displayed on, for example, a product web page, from client program 104. At block 910, data service provider 306 determines whether the product to be displayed on the product web page has product availability information (or other market channel information). At block 912, data service provider 306 provides a query response to client program 104.

Additional business models and technical implementations for dynamic presentation code 112 are provided below. As mentioned above, dynamic presentation code 112 may be implemented in various ways, in various commercial/non-commercial environments, and using various computer technologies. By way of example only, dynamic presentation code 112 may be leveraged by an electronic commerce web site (e.g., manufacturer web site). Dynamic presentation code 112 may be integrated with web page(s) on the manufacturer's web site to enable the manufacturer to dynamically insert web content into a web page based on a query to a data service.

One of ordinary skill in the art will appreciate that dynamic presentation code 112 may be implemented without detailed special-purpose programming, even though the information technology of the manufacturer and the data service may be disparate and non-interoperable. Regardless of the web technology used by the manufacturer's web site, dynamic presentation code 112 may be configured to initiate or produce program code that executes on client program 104. Dynamic presentation code 112 may be leveraged by manufacturer 302 to provide customers 304 with dynamic real-time or near-real-time access to market channel information. The availability of the market channel information may be advantageously provided "upstream" from the actual presentation of the market channel information via the look-ahead feature described above. The availability of the market channel information is provided on the product web page, which relieves the user of the requirement of linking to the market channel information to determine if such information is available. In effect, the availability of the market channel information is integrated with the presentation of the product information, thereby enabling the user to conveniently discern which products have market channel information and perhaps more importantly discern which products do not have available market channel information.

In one of a number of possible embodiments, dynamic presentation code 112 may be implemented using a scripting language, such as JavaScript, to direct a browser to generate a query to the data service. The query protocol may be configured in accordance with any suitable program interface. An exemplary programming interface is displayed in Table 1 below:

TABLE 1

| | | | |
|---|---|---|---|
| Function: | cii_CBL_DataService | | |
| Description: | This script must be called before any of the API functions. It must only be called once for each SKU that is going to be referenced. | | |
| Parameters: | sSKU | String | [Required] The OEM's sku for this product (DVD-RV32S, 3C509C-COMBO) |
| | nRGID | Integer | [Optional] Rule Group ID, this is used mostly when a different UI is used, or when a different Locale us required. |
| Returns: | Nothing | | |
| Sample Call: | <script language="JavaScript"; src="http://3com.links.channelintelligence.com/scripts/cii_CBL_DataService.asp?sSKU=3CR990SVR97" type="text/javascript"></script> | | |
| Function: | cii_ShowLowestPrice | | |
| Description: | This function returns a string containing the prefix text, followed by a fully decorated lowest price, followed by the postfix text. The string will be written directly to the page, no data will be returned to the caller. | | |
| Parameters: | String | | [Required] The OEM's sku for this product (DVD-RV32S, 3C509C-COMBO) |
| | String | | [Optional] The string that you want to appear before the price. This string can contain HTML if needed |
| | String | | [Optional] The string that you want to appear after the price. This string can contain HTML if needed |
| Returns: | Nothing | | |
| Sample Call: | <script language="JavaScript" src="http://3com.links.channelintelligence.com/scripts/cii_CBL_DataService.asp?sSKU=3CR990SVR97" type="text/javascript"></script><script><!--  cii_ShowLowestPrice('3CR990SVR97','Priced as low as','<br />');//--></script>Sample output: | | |
| Function: | cii_ShowLowestInstockPrice | | |
| Description: | This function returns a string containing the prefix text, followed by a fully decorated lowest in stock price, followed by the postfix text. The string will be written directly to the page, no data will be returned to the caller. | | |
| Parameters: | String | | [Required] The OEM's sku for this product (DVD-RV32S, 3C509C-COMBO) |
| | String | | [Optional] The string that you want to appear before the price. This string can contain HTML if needed |
| | String | | [Optional] The string that you want to appear after the price. This string can contain HTML if needed |

TABLE 1-continued

| | |
|---|---|
| Returns: | Nothing |
| Sample Call: | `<script language="JavaScript" src="http://3com.links.channelintelligence.com/scripts/cii_CBL_DataService.asp?sSKU=3CR990SVR97" type="text/javascript"></script>`<br>`<script>`<br>`<!--`<br>    `cii_ShowLowestInstockPrice('3CR990SVR97','Priced as low as','<br />');`<br>`//-->`<br>`</script>` |
| | Sample output:            Priced as low as $104.21 |
| Function: | cii_ShowCBLButton |
| Description: | This function returns a string containing the prefix text, followed by a fully decorated lowest in stock price, followed by the postfix text. The string will be written directly to the page, no data will be returned to the caller. |
| Parameters: | String            [Required] The OEM's sku for this product (DVD-RV32S, 3C509C-COMBO) |
| | String            [Optional] The string that you want to appear before the price. This string can contain HTML if needed |
| | String            [Optional] The string that you want to appear after the price. This string can contain HTML if needed |
| | Integer            [Optional] A numeric value that represents the instance of this button on the page. This value should increment for each button on the page |
| | Rule Group ID            [Optional] Since each SKU can be part of many Rule Groups you may need to supply this to get the correct data for the SKU in question |
| Returns: | Nothing |
| Notes: | This function requires 2 JavaScript objects to be passed to it. The first object is the object that should be used in the event that a CBL page can be display. The second object is the object that should be used in the event there is no CBL page to be displayed. Each object has the same set of properties that can be set:<br>customlinkurl - This is the link that you want to follow when someone clicks on the generated text/image. If this is not supplied, a standard CBL link will be created.<br>customimagehtml - This is what should appear in the event you want a graphical image to appear, like a button. The link will be places around this image<br>linktext - This is the text that will appear as a clickable link, customimagehtml takes precedence over this value.<br>Each Link Value can have placeholders embedded in their data:<br>`<sku />` - which OEM SKU which is the first parameter of this function<br>`<instance />` - which represents the current instance on this page, it will be replaced with a numeric value that will increase for with each call to the function. This allows for multiple button calls to appear on the same page<br>Place holders are useful when you want to define the objects just once and then place multiple buttons on a page, like a category page. |
| Sample Call: | `<script type="text/javascript" language="JavaScript">`<br>`<!--`<br>    `var oCIIPrimaryLink = new Object( );`<br>    `oCIIPrimaryLink["customimagehtml"] = '<IMG NAME="img<instance />" BORDER="0" WIDTH="8" HEIGHT="15" src="http://www.3com.com/images/products/en_US/btno_forward_off.gif"><IMG ALT="Buy Online" BORDER="0" WIDTH="85" HEIGHT="15" src="http://www.3com.com/images/products/en_US/btn_lor_buy.gif">';`<br>    `oCIIPrimaryLink["customlinkurl"] = '<A HREF="javascript:var x=window.open(\x27http://www.3com.com/redirects/redirect-mylist.html?sku=<sku />\x27,\x27Where_to_Buy\x27,\x27width=800,height=550,scrollbars=yes,status=0,toolbar=1,directories=0,menubar=0,location=0,resizable=1,left=100,top=50\x27)">';`<br>    `var oCIIAlternateLink = new Object( );`<br>    `oCIIAlternateLinkl["customlinkurl"] = '<a href="javascript:var x=window.open(\x27http://www.3com.com/reseller/GRLRedirectServlet?country=UnitedStates&language=en&cat=19&sku=<sku />\x27,\x27Where_to_Buy\x27,\x27width=700,height=600,scrollbars=yes,status=0,toolbar=0,directories=0,menubar=0,location=0,resizable=0,left=50,top=50\x27)">';`<br>    `oCIIAlternateLink["linktext"] = '<FONT CLASS="normal">Where to Buy</FONT>';`<br>`// -->`<br>`</script>`<br>`<script language="JavaScript" type="text/javascript">`<br>`<!--`<br>    `cii_ShowCBLButton('3CR990SVR97', oCIIPrimaryLink, oCIIAlternateLink, 1);`<br>`//-->`<br>`</script>` |
| | Sample output:     > BUY ONLINE |

One embodiment of code exemplifying the HTML and JavaScript code to effect such a query is illustrated below in Table 2:

TABLE 2

```
<html>
<head>
<!-- ... OTHER MARKUP CODE ... -->
<script language="JavaScript"
    src=http://dynamicbbserver.com/cii_CBL_DataService_API.asp
    type="text/javascript">
</script>
<script languages="JavaScript"
    src=http://dynamicbbserver.com/cii_CBL_DataService.asp?sSKU="XYZZY"
    type="text/javascript">
</script>
<!-- ... OTHER MARKUP CODE ... -->
</head>
<body>
<!-- ... MARKUP CODE DISPLAYING PAGE AND IMAGE OP SKU XYZZY ... -->
<script type="text/javascript" language="JavaScript">
<!--
        cii_ShowCBLButton('XYZZY', oCIIPrimaryLink, oCIIAlternateLink, 1);
//-->
</script>
<!-- ... OTHER MARKUP CODE ... -->
</body>
</html>
```

As illustrated in Table 2, the program directs the browser to receive JavaScript program code from data service provider 306 at dynamicbbserver.com, and to initialize variables in memory local to the browser for a product of manufacturer 302 using an identification code, XYZZY. This initialization code stores in a local JavaScript object the market channel status information for later inclusion into the markup in accordance with the local API calls. The markup displays a page illustrating the product and queries data service provider 306 for further markup for display on the product web page. A listing of one implementation of the JavaScript program code for generating markup from the local memory objects is illustrated below in Table 3:

TABLE 3

```
//<script>
function cii_CBL_DataService_API_version( ) { return '1.00'; } function cii_StringReplace(rsStr,rsOldStr,rsNewStr) {
    if (!rsStr) ( rsstr = ''; )
    if (!rsOldStr) ( rsOldStr = ''; )
    if (!rsNewStr) ( rsNewStr = ''; )
    var nLen = rsStr.length;
    var nOldLen = rsOldStr.length;
    var nPos = rsStr.indexOf(rsOldStr);
    if (nLen == 0 || nOldLen == 0) ( return rsStr; )
    if (!nPos && (rsOldString != string.substring(0, nOldLen))) ( return
rsStr; )
    if (nPos == -1) ( return rsStr; )
    var sStr = rsStr.substring(0, nPos) + rsNewStr;
    if (nPos + nOldLen < nLen) ( sStr +=
cii_StringReplace(rsStr.substring(nPos + nOldLen, nLen), rsOldStr,
rsNewStr); )
    return sStr;
)
function cii_ShowLowestPrice(rsSKU, rsPrefixString, rsPostfixString) (
    if (oCIICBLDataObject[rsSKU.toUpperCase( )] &&
oCIICBLDataObject[rsSKU.toUpperCase( )].instockCount &&
oCIICBLDataObject[rsSKU.toUpperCase( )].instockCount > 0) (
        if (!rsPrefixString) ( rsPrefixString = ''; ) else ( rsPrefixString
+= ' '; )
        if (!rsPostfixString) ( rsPostfixString = ''; ) else (
rsPostfixString = ' ' + rsPostfixString; )
        document.write(rsPrefixString +
oCIICBLDataObject[rsSKU.toUpperCase( )].lowestInstockPrice +
rsPostfixString);
    )
)
function cii_ShowLowestInstockPrice(rsSKU, rsPrefixString,
rsPostfixString) (
    if (oCIICBLDataObject[rsSKU.toUpperCase( )] &&
oCIICBLDataObject[rsSKU.toUpperCase( )].dealerCount &&
oCIICBLDataObject[rsSKU.toUpperCase( )].dealerCount > 0) (
        if (!rsPrefixString) ( rsPrefixString = ''; ) else ( rsPrefixString
+= ' '; )
```

TABLE 3-continued

```
        if (!rsPostfixString) ( rsPostfixString = ''; ) else (
rsPostfixString = ' ' + rsPostfixString; )
        document.write(rsPrefixString +
oCIICBLDataObject[rsSKU.toUpperCase( )].lowestPrice + rsPostfixString);
    )
)
function cii_ShowCBLButton(rsSKU, roPrimaryLink, roAlternateLink,
rnInstance, rnRuleGroupID) (
    var bOutputLink = true;
    var oLink;
    var aOutput = new Array ( );
    if (!rsSKU) ( return; )
    if (!rnRuleGroupID) ( rnRuleGroupID = −1; )
    if (!oCIICBLDataObject[rsSKU.toUpperCase( )] ||
!oCIICBLDataObject[rsSKU.toUpperCase( )].dealerCount) (
        return;
    )
    if (oCIICBLDataObject[rsSKU.toUpperCase( )].dealerCount > 0 &&
roPrimaryLink) (
        oLink = roPrimaryLink;
    ) else if (oCIICBLDataObject[rsSKU.toUpperCase( )].dealerCount <= 0 &&
roAlternateLink) (
        oLink = roAlternateLink;
    ) else (
        return;
    )
    if (oLink["linkurl"] && oLink["linkurl"] != '') (
        aOutput[aOutput.length] = '<a href="' +
cii_ReplacePlaceHolders(oLink["linkurl"], rsSKU, rnInstance,
rnRuleGroupID) + '">';
    ) else if (oLink["customlinkurl"] && oLink["customlinkurl"] != '') (
        aOutput[aOutput.length] =
cii_ReplacePlaceHolders(oLink["customlinkurl"], rsSKU, rnInstance,
rnRuleGroupID);
    ) else if (oCIICBLDataObject[rsSKU.toUpperCase( )].dealerCount > 0) (
        if (rnRuleGroupID > 0) (
            aOutput[aOutput.length] = '<a
href="JavaScript:manu_CDRuleGroupLink(\x27Belkin\x27, \x27' + rsSKU +
'\x27, \x27' + rnRuleGroupID + '\x27)">';
        ) else (
            aOutput[aOutput.length] = '<a
href="JavaScript:manu_CDLink(\x27Belkin\x27, \x27' + rsSKU + '\x27)">';
        )
    ) else (
        bOutputLink = false;
    )
    if (oLink["imageurl"] && oLink["imageurl"] != '') (
        aOutput[aOutput.length] = '<img src="' + oLink["imageurl"] + '"
border="0"';
        oImage = new Image( );
        oImage.src = oLink["imageurl"];
        if (oImage.width) (
            aOutput[aOutput.length] = ' height="' + oImage.height + '" width="'
+ oImage.width + 37 ";
        )
        if (oLink["onmouseover"] && oLink["onmouseover"] != '') (
            aOutput[aOutput.length] = ' onMouseOver="' + oLink["onmouseover"] +
'";
        )
        if (oLink["onmouseout"] && oLink["onmouseout"] != '') (
            aOutput[aOutput.length] = ' onMouseOut="' + oLink ["onmouseout"] +
'";
        )
        aOutput[aOutput.length] = ' alt="' + oLink["alt"] + '" />';
    ) else if (oLink["customimagehtml"] && oLink ["customimagehtml"] != '')
(
        aOutput[aOutput.length] =
cii_ReplacePlaceHolders(oLink["customimagehtml"], rsSKU, rnInstance,
rnRuleGroupID);
    ) else if (oLink["linktext"]) (
        aOutput[aOutput.length] = cii_ReplacePlaceHolders(oLink["linktext"],
rsSKU, rnInstance, rnRuleGroupID);
    )
    if (bOutputLink) (
        aOutput[aOutput.length] = '</a>';
    )
    document.write(aOutput.joint (''));
)
function cii_ReplacePlaceHolders(rsString, rsSKU, rnInstance,
rnRuleGroupID) (
```

TABLE 3-continued

```
    if (!rsString) ( rsString = ''; )
    if (!rsSKU) ( rsSKU = ''; )
    if (!rnInstance) ( rnInstance = 1; )
    if (!rnRuleGroupID) ( rnRuleGroupID = ''; )
    rsString = cii__StringReplace(rsString, "<sku />", rsSKU);
    rsString = cii__StringReplace(rsString, "<sku/>", rsSKU);
    rsString = cii__StringReplace(rsString, "<sku>", rsSKU);
    rsString = cii__StringReplace(rsString, "<instance>", rnInstance);
    rsString = cii__StringReplace(rsString, "<instance/>", rnInstance);
    rsString = cii__StringReplace(rsString, "<instance />", rnInstance);
    rsString = cii__StringReplace(rsString, "<rgid>", rnRuleGroupID);
    rsString = cii__StringReplace(rsString, "<rgid/>", rnRuleGroupID);
    rsString = cii__StringReplace(rsString, "<rgid />", rnRuleGroupID);
    return rsString;
)
//</script>
```

Upon receiving a query for market channel status regarding a product, the data service may apply business rule(s) 312 to determine appropriate presentation material for insertion into the product web page. Business rules 312 may be defined in any suitable manner, conveniently using XML or a similar language. Data service provider 306 may support a user interface (e.g., a web-based interface) for creating or editing the business rule(s) 312. Business rules 312 are provided in advance by manufacturer 302, and may specifying conditions for the selection or exclusion of market participants, partners, etc., conditions for actions to be taken in preparing a presentation of the market channel information, and conditions for applying or modifying the rules themselves. Although any suitable business rule(s) 312 may be implemented, various exemplary embodiments are illustrated below in Table 4:

TABLE 4

| Action Rule Element | Explanation |
| --- | --- |
| Specify Display Schema | Define a User Interface template specification for Channel Buy Links page to display |
| Specify Dealer List | Define a List of Dealers to be Displayed |
| All Dealers | Display any Dealer Selling the Product |
| Sort Specification | Specify Order For Dealer Display |
| Price Range Specification | Filter Dealers With Price Not Between Upper and Lower Bounds |
| Show Dealer Once | Filter Plural Listings of Dealers in Accordance with Specified Criteria |
| Show Dealers With Stock | Filter Dealers Without Products In Stock |
| Associate Images With Dealer | Specify Graphic to Identify Particular Dealers |
| Associate Phone With Dealer | Specify Phone Numbers to Identify Particular Dealers |
| Associate Text With Dealer | Specify Text to Add to listing for Particular Dealers |
| Associate URL With Dealer | Specify URL to Use with Particular Dealers |
| Filter Dealers Without Prices | Filter Dealers Who Do Not Specify a Price on their Web Site |
| Minimum Authorized Price | Filter Dealers With Less than Minimum Price |
| Filter Dealers | Filter Particular Dealers |
| Filter Dealers Based on Text | Filter Dealers With Specified Text in Product Name, Description or Model |
| Exempt Dealer From Filter | Exempt Particular Dealers From Filter Rules |
| Limit Number of Dealers | Specify Number of Dealers to Show, and criteria for ordering Dealers |
| Associate Display Size | Specify Display Size for Particular Dealers |
| Associate Background Color | Specify Background Color for Particular Dealers |
| Associate Buy Button | Determine Whether or Not a Button or Text Will be Used to Display a Dealer |

Referring to Table 4, one business rule 312 may be specified to select market channel participants, such as dealers, from a pre-determined list, provided that the dealers also have a product in stock at or near the time the query was made, the dealers listed in ascending order in accordance with their price for the product, and defining how the dealers are to be displayed. After applying business rules to the market channel information to determine whether the browser is to be presented with an option to see the information, the data service may also provide dynamic presentation information 112, either in the form of a market channel information button, product availability button, display markup as consistent with the real-time or near-real-time status of the market channel information and the manufacturer's specifications for the product. The market channel information (or other link) may hyperlink to another web page from the manufacturer's web site, a page from data service provider 306, a channel partner's web site, or any other web page, to purchase the product from one or more of the selected market participants.

One of ordinary skill in the art will appreciate that various aspects of the systems, methods, computer programs, and related equipment described above may be implemented in software, hardware, firmware, or a combination thereof. Accordingly, in one embodiment, at least a portion of the logic and/or functionality associated with dynamic presentation code 112 is implemented in software or firmware that is stored in a memory and that is executed by a suitable instruction execution system or processor. It should be appreciated that various process descriptions, functionality, logic, and services described above represent modules, segments, or portions of code which include one or more executable instructions for implementing specific logical functions or steps in the process. It should be further appreciated that any logical functions may be executed out of order from that shown or discussed, including substantially concurrently or in reverse order, depending on the functionality involved, as would be understood by those reasonably skilled in the art.

Furthermore, various logical and/or functional aspects of the code associated with dynamic presentation code 112 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments, particularly any "preferred" or "exemplary" embodiments, are merely possible examples of implementations, merely set forth for a clear understanding of the principles of the invention. Many variations and modifications may be made to the above-described embodiment(s) of the invention without substantially departing from the spirit and principles of the invention. All such modifications and variations are intended to be included within the scope of this disclosure and the present invention and protected by the following claims.

The invention claimed is:

1. A method for dynamically displaying content on a web page, comprising:
    requesting a web page from a web site, hosted by a first server, with a client program, wherein the first server is associated with a manufacturer, the web page related to a product of the manufacturer; receiving the web page at the client program, the web page containing first presentation information integrated with dynamic presentation information; and
    loading the web page at the client program, the loading including:
        rendering the first presentation information associated with the product in the web page with the client program;
        querying a data service storing information for a plurality of products and market participants for the products, including business rules to be applied to product availability requests, and the client program executes the dynamic presentation information to determine second presentation information renderable with the client program in the web page, the querying is a product availability query, wherein the product availability query is created at the client computer and actionable by the data service, and wherein the second presentation information is product availability information, wherein the dynamic presentation instructions include a CBL DataService function having a sSKU parameter, the sSKU parameter representative of a SKU for a product, the CBL DataService function enabling interaction by the client program with the data service, wherein no intermediate processing of the product availability query occurs between the client program and the data service; and
        rendering, by updating the availability of the second presentation information in the web page with the client program including a look-ahead feature in which an indication of the second presentation information available is rendered in a launch web page linked to the web page.

2. The method of claim 1, wherein the first presentation information includes providing information associated with a product, and the second presentation information includes market channel information related to the product.

3. The method of claim 1 wherein the second presentation information comprises a link to a channel partner for the product.

4. The method of claim 1 wherein the first presentation information is related to product availability and the first server is related to a manufacturer, and an area of display where the dynamic presentation instructions are realized is transformed according to the second presentation information.

5. The method of claim 1 wherein the CBL DataService function includes an API (Application Program Interface) that allows two programs to interact with each other.

6. The method of claim 1 wherein the dynamic presentation instructions include a showlowestprice function having a SKU parameter, the SKU parameter representative of a SKU for the product, wherein the showlowestprice function cause a lowest price for the product to be displayed as part of the second presentation information.

7. The method of claim 1 wherein the dynamic presentation instructions include a showlowestpriceinstock function having a SKU parameter the SKU parameter representative of a SKU for the product, wherein the showlowestpriceinstock function causes a lowest price for the product in stock to be displayed as part of the second presentation information.

8. The method of claim 1 wherein the lowest price is written directly to the web page.

9. The method of claim 1 wherein the dynamic presentation instructions include a showCBLButton function having a SKU parameter, the SKU parameter representative of a SKU for the product, and a RuleGroupID parameter representative of a rule group for modifying the display of the second presentation information.

10. The method of claim 1 wherein the rule group includes a Specify Display Schema which corresponds to a user interface template for display.

11. The method of claim 1 wherein the CBL DataService function includes an API (Application Program Interface) that allows two programs to interact with each other.

12. A server, comprising:
    a memory storing instructions for access by a client program being executed on a user computing system, the instructions including the method steps of:
        requesting a web page from a web site, hosted by a first server, with a client program, wherein the first server is associated with a manufacturer, the web page related to a product of the manufacturer;
        receiving the web page at the client program, the web page containing first presentation information integrated with dynamic presentation information; and
        loading the web page at the client program, the loading including:
            rendering the first presentation information associated with the product in the web page with the client program;

querying a data service storing information for a plurality of products and market participants for the products, including business rules to be applied to product availability requests, and the client program executes the dynamic presentation information to determine second presentation information renderable with the client program in the web page, the querying is a product availability query, wherein the product availability query is created at the client computer and actionable by the data service, and wherein the second presentation information is product availability information, wherein the dynamic presentation instructions include a CBL DataService function having a sSKU parameter the sSKU parameter representative of a SKU for a product, the CBL DataService function enabling interaction by the client program with the data service, wherein no intermediate processing of the product availability query occurs between the client program and the data service; and rendering, by updating the availability of the second presentation information in the web page with the client program including a look-ahead feature in which an indication of the second presentation information available is rendered in a launch web page linked to the web page.

13. The server of claim 12, wherein the first presentation information includes providing information associated with a product, and the second presentation information includes market channel information related to the product.

14. The server of claim 12, wherein the second presentation information comprises a link to a channel partner for the product.

15. The server of claim 12, wherein the first presentation information is related to product availability and the first server is related to a manufacturer, and an area of display where the dynamic presentation instructions are realized is transformed according to the second presentation information.

16. The server of claim 12, wherein the CBL DataService function includes an API (Application Program Interface) that allows two programs to interact with each other.

17. The server of claim 12, wherein the dynamic presentation instructions include a showlowestprice function having a SKU parameter, the SKU parameter representative of a SKU for the product, wherein the showlowestprice function causes a lowest price for the product to be displayed as part of the second presentation information.

18. The server of claim 12, wherein the dynamic presentation instructions include a showlowestpriceinstock function having a SKU parameter, the SKU parameter representative of a SKU for the product, wherein the showlowestpriceinstock function causes a lowest price for the product in stock to be displayed as part of the second presentation information.

19. The server of claim 12, wherein the lowest price is written directly to the web page.

20. The server of claim 12, wherein the dynamic presentation instructions include a showCBLButton function having a SKU parameter, the SKU parameter representative of a SKU for the product, and a RuleGroupID parameter representative of a rule group for modifying the display of the second presentation information.

21. The server of claim 12 wherein the rule group includes a Specify Display Schema which corresponds to a user interface template for display.

22. The server of claim 12 wherein the CBL DataService function includes an API (Application Program Interface) that allows two programs to interact with each other.

* * * * *